United States Patent [19]
Nomura et al.

[11] Patent Number: 6,099,949
[45] Date of Patent: Aug. 8, 2000

[54] METHOD OF MOLDING A FIBER-REINFORCED RESIN LAMINATE AND A LAMINATED MOLDING

[75] Inventors: Manabu Nomura; Kaoru Wada; Atsushi Sato; Tomokazu Abe, all of Ichihara, Japan

[73] Assignee: Idemitsu Petrochemical Co., Ltd., Tokyo, Japan

[21] Appl. No.: 09/073,988

[22] Filed: May 7, 1998

[30] Foreign Application Priority Data

Jun. 24, 1997 [JP] Japan ................................. 9-167179

[51] Int. Cl.[7] .................................................. B29C 45/04
[52] U.S. Cl. ................................. 428/304.4; 428/297.4; 428/299.1; 428/299.4; 428/317.9; 264/45.2; 264/45.4; 264/46.4; 264/108; 264/328.7
[58] Field of Search ............................. 428/297.4, 299.1, 428/299.4, 317.9, 304.4; 264/45.2, 45.4, 46.4, 108, 328.7

[56] References Cited

U.S. PATENT DOCUMENTS

| | | | |
|---|---|---|---|
| 5,075,162 | 12/1991 | Okubo et al. | 428/304.4 |
| 5,204,127 | 4/1993 | Prusha | 425/544 |
| 5,843,568 | 12/1998 | Masui et al. | 428/317.9 |
| 5,846,368 | 12/1998 | Sakaguchi et al. | 156/245 |

FOREIGN PATENT DOCUMENTS

| | | |
|---|---|---|
| 0 439 625 | 8/1991 | European Pat. Off. . |
| WO 97/29896 | 8/1997 | WIPO . |

OTHER PUBLICATIONS

Database WPI, Derwent Publications, AN 98–356209, JP 10 138276, May 26, 1998.
Patent Abstracts of Japan, vol. 95, No. 3, Apr. 28, 1995, JP 6 344401, Dec. 20, 1994.
Patent Abstracts of Japan, vol. 16, No. 299 (M–1274), Jul. 2, 1992, JP 04 082717, Mar. 16, 1992.
Patent Abstracts of Japan, vol. 95, No. 1, Feb. 28, 1995, JP 06 293043, Oct. 21, 1994.

*Primary Examiner*—Jerry D. Johnson
*Attorney, Agent, or Firm*—Oblon, Spivak, McClelland, Maier & Neustadt, P.C.

[57] ABSTRACT

Disclosed is a method of molding a fiber-reinforced resin laminate which can manufacture a lightweight laminated molding having excellent mechanical characteristics regardless of the shape of a molding, which can readily unite a surface coat material and a molding while the surface coat material is held in good condition, and which can impart excellent appearance to a laminated molding. Also disclosed is a laminated molding manufactured by the method. The method uses a molding material which contains fiber-containing thermoplastic resin pellets which, in turn, contain reinforcing fibers having a length of 2 mm to 100 mm. The reinforcing fibers account for 5% to 70% by weight of the molding material. A molten resin obtained through the plasticization of the molding material is injected into a die, onto which a surface coat material for covering the surface of a molding is previously attached. After injection of the molten resin into the die cavity is started, a movable die is advanced so as to compress the molten resin contained in the die cavity, followed by expansion of the volume of the die cavity to that of an intended molding.

14 Claims, 4 Drawing Sheets

METHOD OF MOLDING A FIBER-REINFORCED RESIN LAMINATE AND A LAMINATED MOLDING

BACKGROUND OF THE INVENTION

1. Field of the Invention

The present invention relates to a method of molding a fiber-reinforced resin laminate and to a laminated molding. Particularly, the invention relates to a method of molding a lightweight fiber-reinforced resin laminate having excellent rigidity and strength and improved surface condition, as well as to a laminated molding obtained by the same.

2. Description of the Related Art

Conventionally, because of excellent mechanical characteristics such as tensile strength, rigidity, and heat resistance, resin moldings reinforced with glass fibers or like fibers are widely applied to automobile parts, such as inner panel cores, bumper absorbers, door steps, roof racks, rear quarter panels, air-cleaner cases, various pillars, and glove compartment lids, as well as building and civil engineering members, such as outer wall panels, partition panels, and cable troughs.

Such fiber-reinforced resin moldings may be manufactured by the injection molding method in which a molten resin containing fibers is injected into the interior of a die. The injection molding method facilitates the manufacture of a molding having a complicated shape and can advantageously mass-produce moldings having the same shape, since a predetermined molding cycle can be repeated continuously.

When a fiber-reinforced resin molding is to be manufactured by injection molding, the action of increasing the amount of fibers in an attempt to improve the strength and rigidity of a molding tends to increase the weight of a manufactured molding. Accordingly, there is proposed the expansion injection molding method in which a foaming agent is mixedly added to a material resin in order to reduce the weight of a molding and the mixture is subsequently expanded and molded (Japanese Patent Application Laid-Open (kokai) No. 7-247679, etc.).

However, the expansion injection molding method has involved difficulty in obtaining a sufficient expansion ratio even when a foaming agent is used in a relatively large amount. Further, even when a sufficient expansion ratio is obtained, foaming impairs the appearance of a molding. Also, even though reinforcing fibers are contained, a molding sometimes fail to attain satisfactory mechanical characteristics such as strength, rigidity, and impact resistance due to a large hollow formed therein.

In order to obtain a molding having good appearance through expansion injection molding, the counter pressure molding method may conceivably be employed. According to the counter pressure molding method, a gas is injected into a die cavity so as to maintain the internal pressure of the die at a pressure higher than the foaming pressure of a foaming agent. The internal pressure built within the die cavity suppresses the foaming of a foaming agent contained in a molten resin. After the surface of the molten resin is cooled so as to form a skin layer thereon, the foaming agent is allowed to foam.

However, in the counter pressure molding method, after a molten resin is cooled to a certain extent, a foaming agent is allowed to foam; consequently, an expansion ratio is limited, and a relative large hollow or cavity is likely to be formed in a molding. Thus, a molding does not necessarily attain sufficient lightness and strength. Also, since gas facilities, dies having excellent airtightness, and the like are needed in order to increase the pressure of the die cavity, the cost of manufacture increases accordingly.

To solve the above problems, the applicants of the present invention has proposed molding methods which utilize a springback phenomenon which occurs during the molding of a resin containing reinforcing fibers (Japanese Patent Application Nos. 8-28841 and 8-298600).

According to these molding methods, in order to form a skin layer on a resin surface, a molten resin which contains reinforcing fibers longer than a certain length is injected into a die cavity whose capacity is smaller than the volume of an intended molding, or the injected molten resin is once compressed. After being thus filled with the resin, the die cavity is expanded to the volume of the intended molding so as to expand the resin through the utilization of a springback phenomenon. Thus, countless continuous pores are formed within the completed molding.

In this case, when, due to a relatively low content of reinforcing fibers, a resin does not expand sufficiently merely through the utilization of a springback phenomenon, a small amount of foaming agent is added so as to sufficiently expand the resin.

According to such a molding method, reinforcing fibers can be contained in an amount sufficient for obtaining a required strength, and countless pores are formed, in contrast with expansion molding which involves the formation of independent bubbles or a large hollow. Thus, a molding features both sufficient strength and sufficient lightness.

The aforementioned automobile parts and building and civil engineering members are formed from a laminate which is composed of a resin molding and a surface coat material attached onto the surface of the resin molding. Such a laminate has conventionally been manufactured by bonding a surface coat material onto the surface of a resin molding. However, because of a poor production efficiency of this method, there has been employed a method in which a surface coat material is united with a molding during molding so as to omit the step of bonding the surface coat material onto the surface of a molding. Specifically, a surface coat material is previously disposed within a die, a resin is charged into the die, and the charged resin undergoes molding to thereby unite the surface coat material and a molding.

In recent years, even in the case of a laminated molding which includes a surface coat material, there has been a strong demand for a reduction in weight. To meet the demand, a method for reducing the weight of a laminated molding through employment of press molding is proposed in Japanese Patent Application Laid-Open (kokai) No. 7-171841. The method comprises the steps of: disposing a surface coat material between male and female dies; charging a molten resin containing glass fibers and a foaming agent between the male or female die and the surface coat material; closing both dies; and opening the dies apart from each other so as to expand the molten resin through foaming.

However, according to the above press molding method disclosed in Japanese Patent Application Laid-Open (kokai) No. 7-171841, since the dies are filled with the molten resin while they are open apart, burrs are likely to be formed. Further, since a gas generated by the foaming agent before the dies are closed leaks out from the dies, the expansion ratio of the resin decreases. Thus, a large amount of the foaming agent must be used in order to obtain a required expansion ratio. Also, a smooth skin layer is not formed on a surface portion of an obtained laminated molding not covered with the surface coat material. Since molding time is relatively long, manufacturing efficiency is impaired. Further, since the resin is expanded by opening the male and female dies apart from each other, a molding having a complicated shape, such as a ribbed molding, is difficult to manufacture.

SUMMARY OF THE INVENTION

Accordingly, a general object of the present invention is to provide a method of molding a fiber-reinforced resin laminate which can manufacture a lightweight laminated molding having excellent mechanical characteristics such as strength, rigidity, and heat resistance regardless of the shape of a molding, which can efficiently manufacture a laminated molding without consuming a large amount of a foaming agent, which can readily unite a surface coat material and a molding while the surface coat material is held in good condition, and which can impart excellent appearance to a laminated molding, as well as to provide a laminated molding manufactured by the same.

According to a first aspect of the present invention, there is provided a method of molding a fiber-reinforced resin laminate, comprising the steps of: attaching to a die a surface coat material to be attached onto the surface of a molding; and injecting into the die a molten resin obtained through the plasticization of a molding material so as to obtain a unitary laminated molding which includes the surface coat material, the molding material comprising fiber-containing thermoplastic resin pellets which contain reinforcing fibers having a length of 2 mm to 100 mm, the reinforcing fibers accounting for 5% to 70% by weight of the molding material, the die including a movable die capable of advancing into and retreating from the internal cavity of the die, wherein after injection of the molten resin into the die cavity is started, the movable die is advanced so as to compress the molten resin contained in the die cavity, followed by expansion of the volume of the die cavity to that of an intended molding.

According to the first aspect, the molding material contains the reinforcing fibers having at least a predetermined length in at least a predetermined amount. Thus, a springback phenomenon reliably occurs during molding; therefore, the molten resin can be sufficiently expanded. Further, the reinforcing fibers can be contained in an amount sufficient for securing a required strength. Accordingly, an obtained molding features both sufficient strength and sufficient lightness.

Also, after injection of the molten resin into the die cavity is started, the movable die is advanced. That is, the injection of the molten resin is started while the die cavity is expanded to some extent. Accordingly, there can be decreased the pressure of the molten resin acting on the surface coat material, particularly the pressure of the molten resin which directly impinges on the surface coat material at the initial stage of injection. Thus, the surface coat material can be protected from damage or crushing which would otherwise be induced by the pressure of the molten resin. Therefore, the surface coat material can maintain good tactile impression and appearance.

Further, since the movable die is advanced to compress the molten resin contained in the die cavity, the molten resin is pressed against the surface coat material; thus, the molten resin and the surface coat material are reliably united. Through the employment of a simple structure for the movable die, a laminated molding having a complicated shape can be manufactured more reliably and readily than in the case where a resin is expanded by opening dies. Also, through the compression of the molten resin, the molten resin is pressed against the molding surface of the die; thus, a skin layer is formed on the surface of the molten resin along the molding surface of the die. Accordingly, excellent appearance is imparted to an obtained molding.

Since the surface coat material is attached to the die surface before molding is started, the surface coat material and a molding can be united during molding. Accordingly, the step of bonding a surface coat material onto the surface of a molding can be omitted, thereby significantly simplifying the process of manufacturing a laminated molding which is composed of a molding and a surface coat material which covers the surface of the molding.

A molding may be covered with a surface coat material completely or partially.

Examples of such a surface coat material include single-layer materials, such as woven fabrics, nonwoven fabrics, thermoplastic resin surface coat materials, expanded thermoplastic resin surface coat materials, and films printed with patterns or the like; and multilayered surface coat materials, such as a thermoplastic elastomer, vinyl chloride resin, or a like surface coat material which is lined with a thermoplastic resin, an expanded thermoplastic resin, or the like.

Since a molten resin is injected into a die cavity for molding, even a molding having a complicated shape, such as a ribbed molding, can be readily manufactured, and molding time can be reduced as compared with to the case of conventional press molding. Thus, manufacturing efficiency can be improved.

Also, since a molten resin is injected into the interior of a die after the die is closed, the formation of burrs can be prevented.

Further, since a molten resin is expanded through the utilization of a springback phenomenon, the amount of a foaming agent contained in a molding material can be decreased, thereby preventing an impairment of molding quality which would otherwise be induced by the contained foaming agent.

When the length of reinforcing fibers is less than 2 mm, sufficient strength may not be imparted to a molding, and fiber-containing thermoplastic resin pellets may crack during manufacture thereof. Further, a sufficient expansion force will not be induced from a springback phenomenon. By contrast, when the length is in excess of 100 mm, bridging may occur during injection molding, or plasticization may be impaired. Thus, molding may become difficult to perform.

When a molding material contains reinforcing fibers in an amount less than 5% by weight, a springback phenomenon cannot be expected to induce expansion, and the rigidity and impact strength of a molding may become insufficient. By contrast, when a molding material contains reinforcing fibers in an amount greater than 70% by weight, the amount of a molten resin becomes excessively small, resulting in poor plasticization or low fluidity. As a result, a good molding may not be obtained.

A foaming agent can be contained in a molding material in an amount of not greater than 3 parts by weight based on 100 parts by weight of the molding material.

By virtue of a molding material containing a small amount of a foaming agent as above, even when, due to a low content of reinforcing fibers, a mere springback phenomenon cannot be expected to induce sufficient expansion of a molten resin, the retreat of a movable die enables the molten resin to be reliably expanded to the volume of an intended molding, since the foaming of the foaming agent compensates for the lack of resin expansion.

Specifically, a foaming agent can be contained in an amount of 0.01 parts to 3 parts by weight. When the content of a foaming agent is in excess of 3 parts by weight, a silver mark may be formed with a resultant impairment in appearance, and a relatively large hollow may be formed in a molding, resulting in a significant impairment in strength and rigidity.

As mentioned above, since a foaming agent is added in order to compensate any insufficiency of a springback phenomenon, the content of the foaming agent is preferably minimized.

A foaming agent to be added is not particularly limited so long as it is thermally decomposed to generate a gas.

Examples of such a foaming agent include oxalic acid derivatives, azo compounds, hydrazine derivatives, semicarbazides, azide compounds, nitroso compounds, triazole, urea and its related compounds, nitrites, hydrides, carbonates, and bicarbonates.

Specific examples of such a foaming agent include azodicarbonamide (ADCA), benzenesulfohydrazide, N,N-dinitropentamethylenetetramine, and terephthalazide.

The aforementioned molding material also comprises fiber-containing thermoplastic resin pellets which have a length of 2 mm to 100 mm and which contain reinforcing fibers having a length equal to that of the resin pellets and arranged in parallel in an amount of 20% to 80% by weight. Alternatively, the molding material may contain reinforcing fibers in an amount of 5% to 70% by weight.

That is, the aforementioned fiber-containing thermoplastic resin pellets may be contained singly or in combination with other resin pellets.

When there are used pellets which contain reinforcing fibers arranged in parallel in an amount of 20% to 80% by weight, the fibers are less likely to break even when the pellets are plasticized and kneaded in an injection apparatus.

Examples of reinforcing fibers to be contained in the aforementioned resin pellets include fibers shown below in (1) to (4). Particularly preferably, either glass fibers or carbon fibers are employed.

(1) Ceramic fibers: boron fibers, silicon carbide fibers, alumina fibers, silicon nitride fibers, zirconia fibers (2) Inorganic fibers: glass fibers, carbon fibers (3) Metallic fibers: copper fibers, brass fibers, steel fibers, stainless steel fibers, aluminum fibers, aluminum alloy fibers (4) Organic fibers: ultra high molecular weight polyethylene fibers, polypropylene fibers, aramid fibers, polyarylate fibers, polyester fibers, polyamide fibers Usable glass fibers are E-glass or S-glass fibers having an average fiber diameter of not greater than 25 $\mu$m, preferably 3 $\mu$m to 20 $\mu$m.

When the glass fiber diameter is less than 3 $\mu$m, glass fibers do not intimately contact a resin, and thus the impregnation of glass fibers with a resin becomes difficult to perform during the manufacture of pellets. By contrast, when the glass fiber diameter is in excess of 20 $\mu$m, the glass fibers are likely to break or chip during melting and kneading.

A thermoplastic resin serving as a main component of resin pellets is not particularly limited. Examples of such a thermoplastic resin include polypropylene, propylene-ethylene block copolymers, propylene-ethylene random copolymers, polyolefin resins such as polyethylene, polystyrene resins, ABS resins, polyvinyl chloride resins, polyamide resins, polyester resins, polyacetal resins, polycarbonate resins, aromatic polyether or thioether resins, aromatic polyester resins, polysulfone resins, and acrylate resins.

The above thermoplastic resins may be used singly or in combination.

Among the thermoplastic resins, preferred ones are polypropylene resins, such as polypropylene, block or random copolymers of propylene and another olefin, and mixtures thereof, and particularly preferable are polypropylene resins which contain a polyolefin resin modified with unsaturated carboxylic acid or its derivative.

In the manufacture of pellets from any of the above thermoplastic resins and glass fibers through pultrusion or solution impregnation, glass fibers are surface-treated through use of a coupling agent and are subsequently bundled in groups of 100 fibers to 10,000 fibers, preferably 150 fibers to 5,000 fibers, through use of a binder.

The coupling agent may be selected as adequate from among conventional so-called silane coupling agents and titanium coupling agents.

Examples of such a coupling agent include amino silanes or epoxy silanes, such as $\gamma$-aminopropyltriethoxysilane, N-$\beta$-(aminoethyl)-$\gamma$-aminopropyltrimethoxysilane, $\gamma$-glycidoxypropyltrimethoxysilane, and $\beta$-(3,4-epoxycyclohexyl)ethyltrimethoxysilane. Particularly, the former amino silane compounds are preferable.

Example methods of surface-treating glass fibers through use of such a coupling agent include a sizing process, a dry mixing method, and a spraying method. In the sizing process, a coupling agent is mixed into an organic solvent to obtain an organic solution or suspension, and subsequently the thus-obtained solution or suspension, serving as a so-called sizing agent, is applied to glass fibers.

In the surface treatment of glass fibers, in addition to the aforementioned coupling agent, a film-forming substance for glass may be used. Examples of such a film-forming substance include polyesters, urethane polymers, epoxy polymers, acrylic polymers, vinyl acetate polymers, and isocyanate polymers, with urethane polymers and olefin polymers being preferred.

Examples of a binder include urethane compounds, olefin compounds, acrylic compounds, butadiene compounds, and epoxy compounds.

Among the above binders, urethane binders may be of either a single-component type, such as oil-modified type, moisture-hardened type, block type, or the like, or a two-component type such as catalyst-hardened type, polyol-hardened type, or the like, so long as urethane binders, which are usually obtained through reaction of a diisocyanate compound and polyhydric alcohol, contain polyisocyanate in an amount of not less than 50% by weight.

Examples of an olefin binder include polyolefin resins modified with unsaturated carboxylic acid or its derivative.

Glass fibers bundled through use of the above binder are coated and impregnated with a thermoplastic resin so as to manufacture resin pellets which contain glass fibers.

Example methods of coating and impregnating glass fibers with a thermoplastic resin include the following: a bundle of fibers is immersed in a molten resin contained in a container or the like so as to impregnate the bundle with the resin; a bundle of fibers is immersed in a relevant resin suspension or emulsion so as to impregnate the bundle with the resin, and subsequently the bundle of fibers is caused to pass through a coating die; and a molten resin adhering to a bundle of fibers is forcibly spread through use of a die so that the bundle of fibers is impregnated with the resin.

Also, a pultrusion process combined with pressing is applicable to a process of impregnating fibers with a resin. Specifically, a bundle of fibers is drawn for impregnation with a molten resin through a die which has pits and projections formed in the inner wall thereof in order to establish intimate contact between a bundle of fibers and a resin, i.e. to improve wettability. Then, the bundle of fibers is pressed through use of pressure rollers.

When glass fibers and a molten resin show intimate contact, or good wettability, therebetween, the glass fibers are readily impregnated with the molten resin, and pellets can be readily manufactured. Thus, the aforementioned step of bundling fibers through use of a binder may be omitted.

In order to establish intimate contact between glass fibers and a resin, the resin may be polarized, or a functional group which reacts with a coupling agent may be grafted onto the surfaces of glass fibers.

The thus-formed bundle of long fibers (assuming the form of strand or the like) impregnated with a resin is cut in its longitudinal direction to obtain resin pellets which contain long fibers having the same length as that of the pellets.

The form of a bundle of long fibers impregnated with a resin, from which resin pellets are obtained, is not limited to a strand having a substantially circular cross section. A bundle of long fibers impregnated with a resin may assume the form of sheet, tape, or band and be cut to obtain resin pellets having a predetermined length.

To resin pellets may be added, as needed, stabilizers, antistatic agents, weathering stabilizers, coloring agents, short fibers, fillers such as talc, elastomers, fire retardants (fire retardant aids), anti-oxidizing agents, interface modifiers, and the like.

According to a second aspect of the present invention, there is provided a laminated molding manufactured by the method of the invention (first aspect of the invention). Specifically, the present invention provides a laminated molding comprising a body of a fiber-reinforced resin and a surface coat material integrated therewith, manufactured by the steps of: attaching to a die the surface coat material to be attached onto the surface of a molding; and injecting into the die a molten resin obtained through the plasticization of a molding material so as to obtain a unitary laminated molding which includes the surface coat material, the molding material comprising fiber-containing thermoplastic resin pellets which contain reinforcing fibers having a length of 2 mm to 100 mm, the reinforcing fibers accounting for 5% to 70% by weight of the molding material, the die including a movable die capable of advancing into and retreating from the internal cavity of the die, wherein after injection of the molten resin into the die cavity is started, the movable die is advanced so as to compress the molten resin contained in the die cavity, followed by expansion of the volume of the die cavity to that of an intended molding so as to obtain a lightweight unitary laminate which includes the surface coat material.

According to the second aspect, the laminated molding features light weight and excellent mechanical characteristics such as tensile strength, rigidity, and heat resistance; moreover, a surface coat material and a molding are united while the surface coat material is held in good condition, thereby providing good appearance. Accordingly, the laminated molding of the invention is widely applicable to automobile parts, building and civil engineering members, household appliances, furniture, various kinds of equipment, and the like.

Examples of such an automobile part include inner panels, trunk boards, door steps, roof racks, rear quarter panels, various pillars, and glove compartment lids.

Examples of such a building or civil engineering member include outer wall panels, partition panels, and cable troughs.

Examples of such furniture include desks and chairs. Examples of such equipment include system kitchen equipment and benches.

Among these applications of the laminated molding of the invention, application to transportation machinery parts such as automobile parts improves the mechanical efficiency or the like of transportation machinery. Also, application to building and civil engineering members such as outer wall panels and partition panels facilitates installation work due to the lightness of the laminated molding, and enables various design features to be imparted to such members.

The expansion ratio of a molten resin is not particularly limited. However, a molten resin is preferably expanded to 1.3 times to 6 times its original volume, particularly preferably 1.5 times to 5 times.

Through the expansion of a molten resin to 1.3 times to 6 times its original volume, a large number of continuous pores are reliably formed within a resin molding.

When the expansion ratio is less than 1.3, independent bubbles may be formed within a resin molding; consequently, sufficient reduction of weight may not be attained. By contrast, when the expansion ratio is in excess of 6, the rigidity and compression strength of a resin molding may be impaired.

Reinforcing fibers contained in the laminated molding of the invention have an average length of 2 mm to 20 mm, preferably 4 mm to 12 mm.

When the average length of reinforcing fibers is not less than 2 mm, a molten resin can be readily expanded to a desired volume through the utilization of a springback phenomenon. Accordingly, a molding becomes sufficiently light and features an improvement in mechanical characteristics such as impact resistance and rigidity.

By contrast, when the average length of reinforcing fibers is in excess of 20 mm, reinforcing fibers encounter difficulty in entering a fine portion, rib, or the like of a laminated molding. As a result, the strength of such a portion decreases due to insufficient presence of reinforcing fibers.

In an injection molding machine used for molding a laminate which contains reinforcing fibers having an average length of 2 mm to 20 mm, a flow path for a molten resin preferably has a relatively large diameter for a nozzle, a sprue, a runner, a gate, and the like.

Specifically, the inner diameter of a nozzle is preferably not less than 5 mm, more preferably not less than 6 mm.

The screw of an injection molding machine preferably has a compression ratio of not greater than 2.5, more preferably not greater than 2.0.

According to the present invention, there is obtained a lightweight laminated molding having excellent mechanical characteristics such as strength, rigidity, and heat resistance. Also, a laminated molding can be efficiently manufactured through use of a relatively small amount of a foaming agent. Further, a surface coat material and a molding can be readily united while the surface coat material is held in good condition. Thus, there is provided a fiber-reinforced resin laminated molding having excellent appearance.

DESCRIPTION OF THE PREFERRED EMBODIMENTS

Embodiments of the present invention will now be described with reference to the drawings.

Figure 1:
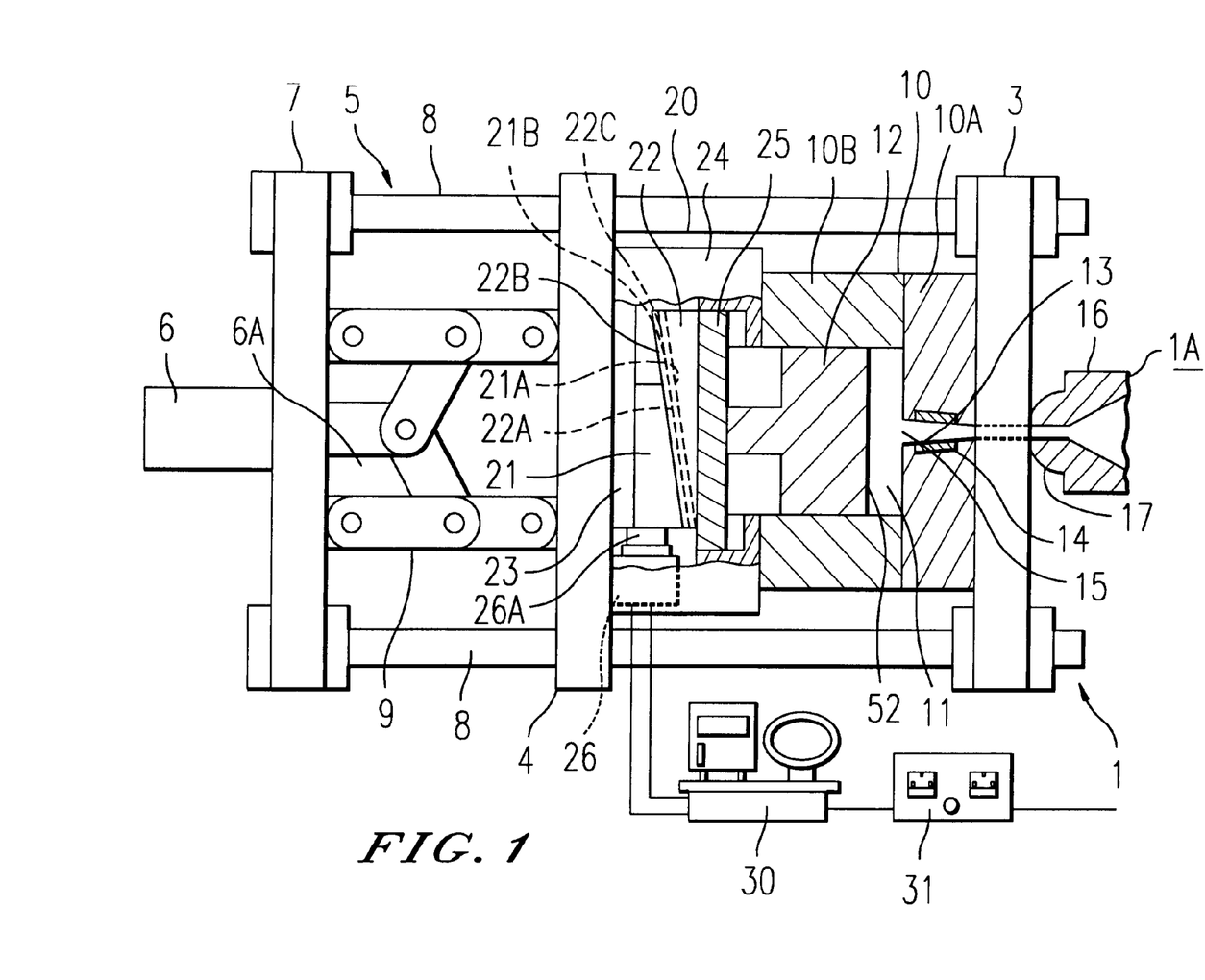
FIG. 1 is a side view with a partial cross section showing an injection molding machine according to an embodiment of the present invention.

FIG. 1 shows an injection molding machine 1 according to an embodiment of the present invention. In the injection molding machine 1, a molten resin is injected into the interior of a die 10 (for molding a ⅙ control panel) to obtain a molding.

The die 10 includes a stationary die 10A and a movable die 10B. A movable core 12 is attached to the movable die 10B of the die 10 such that the movable core 12 can advance into and retreat from the cavity 11 of the die 10. Through the movement of the movable core 12, the volume of the cavity 11 varies.

The surface of the movable core 12 located on the side of the cavity 11 is adapted such that a surface coat material 52 for covering the surface of a molding can be attached thereto. Specifically, the movable core 12 has attachment means (not shown), such as pins, vacuum chuck holes, or the like, for securing the surface coat material 52.

The surface coat material 52 may be attached onto the surface of the stationary die 10A. Alternatively, the movable core 12 and the stationary die 10A may both be adapted to allow the surface coat material 52 to be attached thereto.

Examples of the surface coat material 52 include single-layer materials, such as woven fabrics, nonwoven fabrics, thermoplastic resin surface coat materials, expanded thermoplastic resin surface coat materials, and films printed with patterns or the like; and multilayered surface coat materials, such as a thermoplastic elastomer, vinyl chloride resin, or the like surface coat material which is lined with a thermoplastic resin, an expanded thermoplastic resin, or the like.

The stationary die 10A of the die 10 has a path 13 such as sprue, runner, or the like formed therein for introducing a molten resin into the interior of the die 10. A zonal electric-heating element 14 is provided around the path 13 so that the path 13 serves as a so-called hot runner to prevent a molten resin flowing therethrough from curing.

Figure 2:
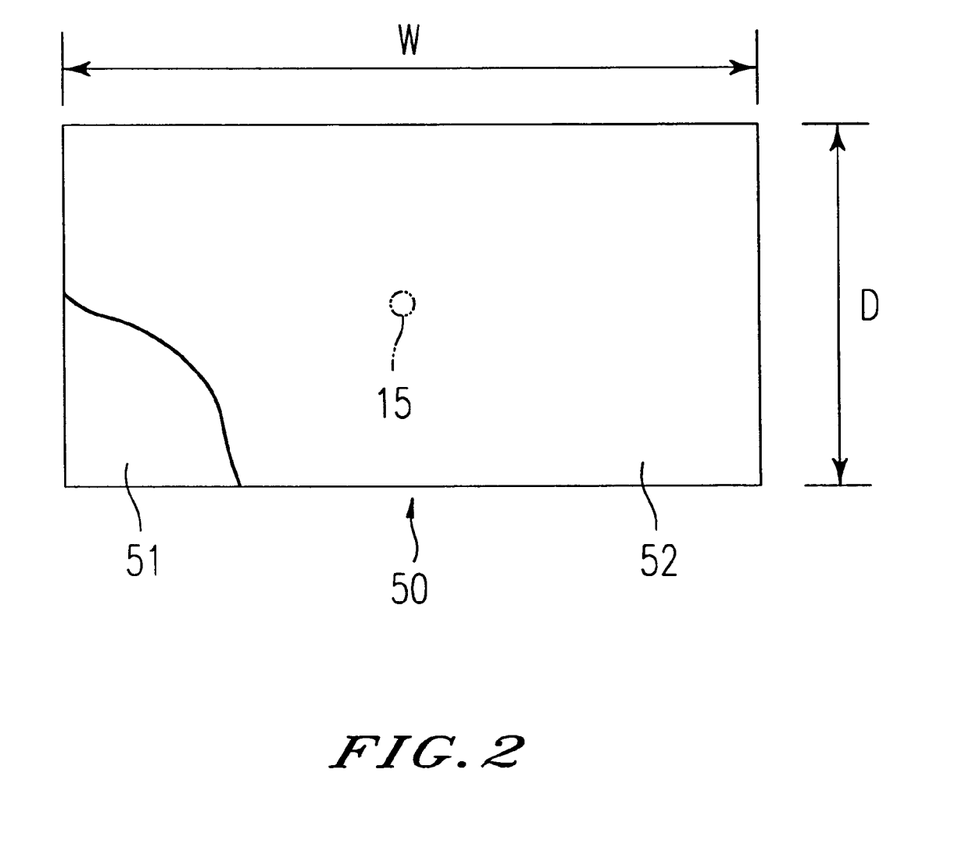
FIG. 2 is a partially broken plan view showing a laminated molding obtained by the injection molding machine of FIG. 1.

The above die 10 is configured so as to form a laminated molding 50 as shown in FIG. 2. The laminated molding 50 is composed of a resin molding 51 and the surface coat member 52. The resin molding 51 has a rectangular flat shape having a width W and a depth D. The surface coat material 52 is attached onto one side (the surface located on the side of the movable core 12) of the molding 51. The central portion of the back surface (the surface opposite to the surface coat material 52) of the molding 51 corresponds to a gate 15 (see FIG. 1), which is an end of the path 13 located on the side of the cavity 11 in the die 10.

Referring back to FIG. 1, the injection molding machine 1 includes an injection apparatus 1A for injecting a molten resin into the cavity 11 of the die 10, a stationary die plate 3 to which the stationary die 10A is attached, a movable die plate 4 to which the movable die 10B is attached, a die-clamping apparatus 5 for advancing the movable die plate 4 toward the stationary die plate 3, and a die-moving apparatus 20 for moving the movable core 12 of the die 10 to a certain position located within a predetermined range and for stopping the movable core 12 in the position.

In the injection apparatus 1A, resin pellets fed into the interior of an injection cylinder 16 are kneaded and plasticized through use of an unillustrated screw. A molten resin obtained through the plasticization of the resin pellets is discharged through a nozzle 17 provided at the tip of the injection cylinder 16. The screw may have a compression ratio of not more than 2.5, and the nozzle 17 may have a diameter of not less than 5 mm.

The movable die plate 4 is slidably mounted on tie bars 8, which extend between the stationary die plate 3 and a stationary plate 7 to which an oil hydraulic cylinder apparatus 6 for die clamping is fixed.

The die-clamping apparatus 5 has a toggle mechanism 9 to which the piston rod 6A of the oil hydraulic cylinder apparatus 6 is connected. The pressing force of the oil hydraulic cylinder apparatus 6 is amplified by the toggle mechanism 9. The thus-amplified pressing force causes the movable die plate 4 to advance. Thus, the movable die 10B is brought in close contact with the stationary die 10A, thereby closing the die 10.

The die-moving apparatus 20 is disposed between the movable die plate 4 and the movable die 10B and adapted such that the movable core 12 is advanced into the cavity 11 so as to apply a compression force to a molten resin injected into the cavity 11 and such that the movable core 12 is retreated so as to expand the volume of the cavity 11.

The die-moving apparatus 20 also serves as cavity clearance variation means for arbitrarily varying the clearance between the molding surface of the movable core 12 and that of the stationary die 10A.

The die-moving apparatus 20 includes inclined surfaces 21A and 22A which are inclined with respect to the moving direction of the movable core 12, a pair of inclination members 21 and 22 for abutting the inclined surfaces 21A and 22A against each other, a base plate 23 having a flat surface perpendicular to the moving direction of the movable core 12, a die attachment base 24 for connecting the movable die plate 4 to the movable die 10B, and a compression plate 25 for connecting the movable core 12 to the inclination member 22.

The inclination member 21 is slidable along the surface of the base plate 23 attached to the movable die plate 4 and is driven by an oil hydraulic cylinder apparatus 26 so as to move in a direction perpendicular to the moving direction of the movable core 12.

Guide portions 22B are provided at both side edges of the inclined surface 22A of the inclination member 22 along the moving direction of the inclination member 21. A groove 22C is formed in the inner surface of the guide portion 22B along the longitudinal direction of the guide portion 22B.

An elongated projection 21B is formed on each of the side surfaces of the inclination member 21 which contact the corresponding inner surfaces of the guide portions 22B. The elongated projections 21B engage the corresponding grooves 22C formed in the guide portions 22B of the inclination member 22.

Accordingly, when the piston rod 26A of the oil hydraulic cylinder apparatus 26 is advanced, the inclination member 21 presses the inclination member 22 to thereby cause the movable core 12 to advance. When the piston rod 26A of the oil hydraulic cylinder apparatus 26 is retreated, the inclination member 21 withdraws the inclination member 22 to thereby cause the movable core 12 to retreat.

An oil hydraulic unit 30 is provided for feeding hydraulic oil pressure to the die-moving apparatus 20. Further, a control unit 31 is provided for controlling the oil hydraulic unit 30 so as to cause the die-moving apparatus 20 to perform a desired operation.

The control unit 31 has a sequence control circuit such as a digital sequencer or the like so that a user can program operations to be sequentially performed; for example, the movable core 12 is caused to follow the sequential steps of stepwise advancing and retreating relative to the cavity 11, temporarily stopping in a predetermined position, and retreating.

Next will be described a molding operation (molding procedure) according to the present embodiment.

First, the die 10 and the die-moving apparatus 20 are attached to the ordinary injection molding machine 1 as shown in FIG. 1. A predetermined molding material is charged into an unillustrated hopper.

Then, after resin pellets are fed into the injection cylinder 16 of the injection apparatus 1A, the injection molding machine is started to thereby start plasticizing and kneading the resin pellets contained in the injection cylinder 16. In the injection cylinder 16, the resin pellets are sufficiently plasticized and kneaded to obtain a molten resin in an amount required for manufacturing the molding 51. Also, through such plasticization and kneading, countless glass fibers in the molten resin are uniformly distributed and sufficiently intertwined with each other, thereby facilitating the occurrence of a springback phenomenon.

The molding material is fiber-containing thermoplastic resin pellets having a length of 2 mm to 100 mm and containing polypropylene as a main component. Each of the resin pellets contains reinforcing glass fibers which have a length equal to that of the resin and are arranged in parallel, in an amount of 20% to 80% by weight.

When the molding material is a mixture of the above fiber-containing resin pellets and fiber-free resin pellets, the molding material contains reinforcing glass fibers in an amount of 5% to 70% by weight.

The molding material may also contain a foaming agent in an amount of not greater than 3 parts by weight with respect to 100 parts by weight of the molding material.

The addition of a foaming agent is achieved by mixing master batch pellets containing a foaming agent with the above resin pellets. Examples of such a master batch pellet containing a foaming agent include POLYSLEN EV306G (trade name, product of Eiwa Kasei Kogyo Co., Ltd.) and POLYSLEN TS-182 (trade name, product of Eiwa Kasei Kogyo Co., Ltd.).

The surface coat material 52 is attached onto the movable core 12 of the die 10. Subsequently, the die-clamping apparatus 5 is operated so as to move the movable die plate 4 toward the stationary die plate 3 until the movable die 10B abuts the stationary die 10A to thereby close the die 10 as shown in FIG. 1.

Figure 3A:
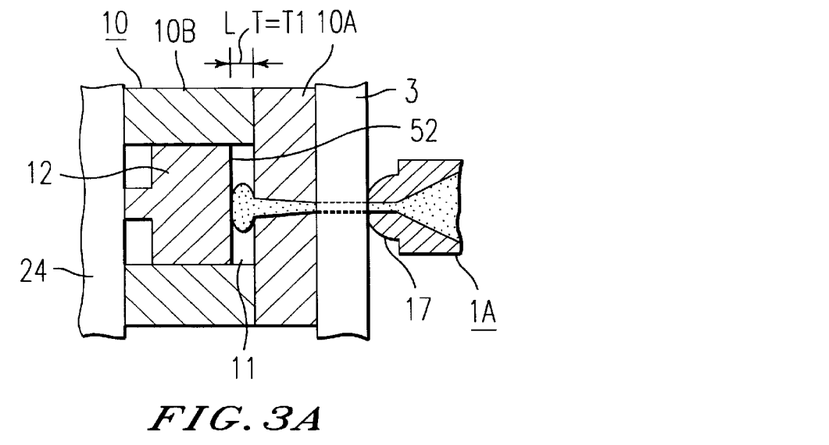
FIG. 3A is a view showing a step of molding by the injection molding machine of FIG. 1.

Next, the mold-moving apparatus 20 is operated so as to move the movable core 12 to position L as shown in FIG. 3A. Thus, the thickness T of the cavity 11 becomes T1. In this state, a molten resin is injected into the interior of the die 10 from the injection apparatus 1A. When all the molten resin is injected into the cavity 11, the step of injecting the molten resin is completed.

The thickness T1 of the cavity 11 defined by the movable core 12 resting in the position L is determined such that the volume of the cavity 11 having the thickness T1 becomes larger than the volume of all the injected molten resin.

Accordingly, the molten resin is injected into the cavity 11 having a volume greater than that of the molten resin to be injected into the cavity 11. Thus, the pressure of the molten resin imposed on the surface coat material 52 becomes smaller than in the case that the cavity 11 has the same volume as that of the molten resin to be injected thereinto. Particularly, since the distance between the gate 15 and the surface coat material 52 is expanded than in the above case, the pressure induced by the molten resin which directly impinges on the surface coat material 52 at the initial stage of injection becomes lower than in the above case.

Figure 3B:
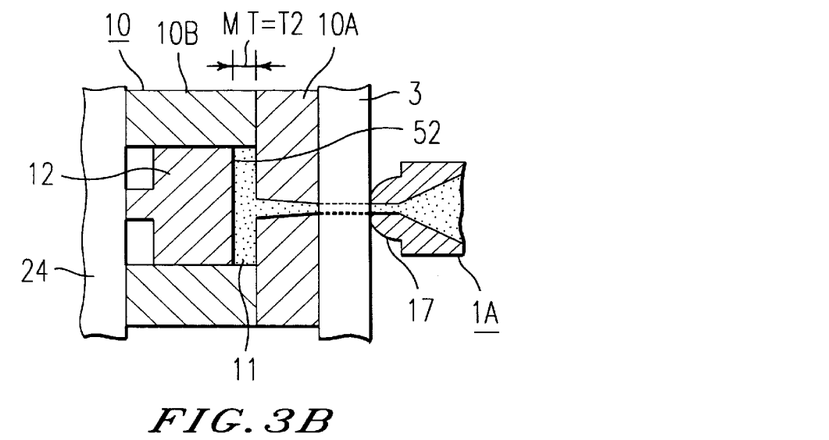
FIG. 3B is a view showing a step of molding by the injection molding machine of FIG. 1.

After injection of the molten resin is started, the die-moving apparatus 20 is operated so as to advance the movable core 12 to position M as shown in FIG. 3B. Thus, the thickness T of the cavity 11 becomes T2.

The thickness T2 of the cavity 11 defined by the movable core 12 resting in the position M is determined such that the cavity 11 having the thickness T2 is completely filled with all the injected molten resin.

As a result of the above advancement of the movable core 12, the cavity 11 is completely filled with the molten resin under pressure. Accordingly, the molten resin is pressed against the surface coat material 52, thereby uniting the molten resin and the surface coat material 52. The molten resin is also closely pressed against the molding surface of the die 10, particularly against the molding surface of the stationary die 10A. Thus, a skin layer is formed on the surface of the molten resin along the molding surface.

The movable core 12 may start advancing before, immediately after, or after the elapse of a predetermined time following the completion of injection of the molten resin.

Figure 3C:
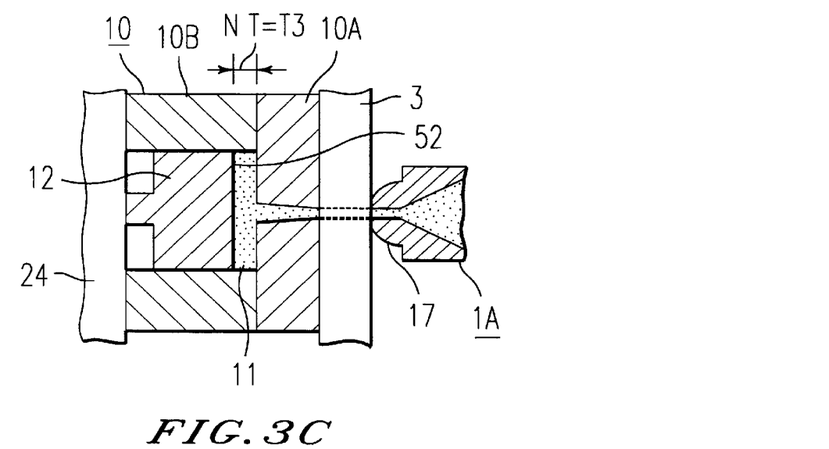
FIG. 3C is a view showing a step of molding by the injection molding machine of FIG. 1.

When the movable core 12 reaches the position X, the die-moving apparatus 20 is operated again so as to retreat the movable core 12 to position N as shown in FIG. 3C. Thus, the thickness T of the cavity 11 becomes T3. The thickness T3 of the cavity 11 defined by the movable core 12 resting in the position N is determined such that the volume of the cavity 11 having the thickness T3 becomes identical to that of the laminated molding 50.

When the movable core 12 is retreated, a springback phenomenon causes the molten resin to expand. Specifically, glass fibers contained in the molten resin are released from compression and thus apply an elastic restoring force to the molten resin; consequently, the molten resin expands, thereby forming countless pores within the molten resin. Thus, there is obtained the lightweight laminated molding 50 having a volume greater than that of the molding material used.

The movable core 12 may be retreated before, immediately after, or after the elapse of a predetermined time following the completion of injection of the molten resin. When the movable core 12 is to be retreated after the completion of injection, the time between the completion of injection and the start of retreat of the movable core 12 can be set somewhere in a range of 0 second to 10 seconds. The range may somewhat vary depending on the die temperature.

The retreat rate Vr of the movable core 12 is 0.05 mm/sec to 100 mm/sec, preferably 0.05 mm/sec to 50 mm/sec.

After the elapse of a predetermined time required for sufficiently cooling the laminated molding 50, the die-clamping apparatus 5 is operated so as to retreat the movable die plate 4 in order to open the die 10. Then, the laminated molding 50, which is composed of the molding 51 and the surface coat material 52 attached to the surface of the molding 51, is removed from the interior of the die 10, thereby completing the molding operation.

Subsequently, the above molding operation is repeated as needed.

The laminated molding 50 obtained through the molding procedure described above features lightness, excellent mechanical characteristics such as tensile strength, rigidity, and heat resistance, and good appearance.

In order to reliably form a large number of continuous pores within the molding 51 of the laminated molding 50, the molten resin is preferably expanded to 1.3 times to 6 times its original volume, more preferably 1.5 times to 5 times.

In order to facilitate the springback-induced expansion of the molten resin to a desired size and to improve mechanical characteristics such as impact resistance and rigidity, the average length of fibers contained in the molding 51 is 2 mm to 20 mm.

The above embodiment produces the following effects.

A molding material contains reinforcing fibers not shorter than a predetermined length in at least a predetermined amount. Accordingly, a springback phenomenon reliably occurs during molding; thus, a molten resin can be sufficiently expanded. Also, reinforcing fibers can be contained in an amount sufficient for attaining a required strength. Thus, the laminated molding 50 features both sufficient strength and sufficient lightness.

Fiber-containing thermoplastic resin pellets serving as a molding material have a length of 2 mm to 100 mm and contain reinforcing fibers having a length equal to that of the pellets and arranged in parallel in an amount of 20% to 80% by weight. Accordingly, even when the fiber-containing thermoplastic resin pellets are sufficiently plasticized in the injection apparatus 1A, the contained fibers are less likely to be broken, so that the fiber length is held intact. Therefore, even when the fiber-containing thermoplastic resin pellets are mixed with other resin pellets, a springback phenomenon reliably occurs during molding; thus, a molten resin can be sufficiently expanded.

Accordingly, by adequately adjusting the mixing ratio between fiber-containing thermoplastic resin pellets and fiber-free resin pellets, the content of reinforcing fibers can be arbitrarily adjusted within the range from 5% to 70% by weight, and thus a required reinforcing-fibers content can be readily attained. Therefore, required lightness and mechanical characteristics can be imparted to the laminated molding 50.

Further, since the movable core 12 is advanced after injection of a molten resin is started, i.e. the injection of a molten resin is started while the cavity 11 is expanded, there can be reduced the pressure of a molten resin acting on the surface coat material 52, particularly the pressure induced by the molten resin which directly impinges on the surface coat material 52 at the initial stage of injection. Accordingly, the surface coat material 52 can be protected from damage or crushing which would otherwise be induced by the pressure of a molten resin. Therefore, the surface coat material 52 can hold its unique tactile impression and appearance in good condition.

Further, before injection of a molten resin is started, the movable core 12 is moved to the position L to thereby set the thickness of the cavity 11 at T1 so that the volume of the cavity 11 becomes larger than that of a molten resin to be completely injected. Accordingly, the pressure of a molten resin imposed on the surface coat material 52 can be significantly reduced as compared with a pressure imposed on the surface coat material 52 during conventional injection molding. Thus, the surface coat material 52 is more reliably protected.

Also, after the injection of a molten resin starts, the movable core 12 is advanced to the position M so that the thickness T of the cavity 11 becomes T2. Thus, the volume of the cavity 11 is reduced so as to become smaller than that of the laminated molding 50. This causes a molten resin to be filled into the cavity 11 in compressed condition, so that the molten resin is closely pressed against the surface coat material 52. As a result, the surface coat material 52 and the molding 51 can be reliably united.

Further, through the above compression of a molten resin, the molten resin is also pressed against the molding surface of the die 10. Accordingly, a skin layer is formed on the molten resin surface along the molding surface of the die 10, particularly the molding surface of the stationary die 10A. Consequently, the laminated molding 50 having excellent appearance is obtained.

Since the surface coat material 52 is attached to the die 10 before molding starts, the surface coat material 52 and the molding 51 can be united while the molding 51 is being formed. Accordingly, the step of bonding the surface coat material 52 onto the surface of the molding 51 can be omitted, thereby significantly simplifying the process of manufacturing the laminated molding 50 which is composed of the molding 51 and the surface coat material 52 which covers the surface of the molding 51.

Further, since a molten resin is injected into the cavity 11 for molding, even the laminated molding 50 having a complicated shape, such as a ribbed molding, can be readily manufactured, and molding time can be reduced as compared with conventional press molding. Thus, manufacturing efficiency can be improved.

Also, since a molten resin is injected into the interior of the die 10 after the die 10 is closed, the formation of burrs can be prevented.

Further, since a molten resin is expanded through the utilization of a springback phenomenon, the amount of a foaming agent contained in a molding material can be decreased, thereby preventing an impairment of molding quality which would otherwise be induced by the contained foaming agent.

When reinforcing fibers cannot be contained in a amount required for attaining a predetermined expansion ratio, or in a like case, a foaming agent is added, as needed, in an amount not greater than 3 parts by weight based on 100 parts by weight of a molding material. Accordingly, even when a mere springback phenomenon cannot be expected to induce sufficient expansion of a molten resin, the foaming of the foaming agent compensates for the lack of resin expansion to thereby expand the molten resin to a sufficient extent.

Further, since a foaming agent is added in such an amount as to compensate any insufficiency of a resin expansion attained by a springback phenomenon, independent bubbles or a large hollow is not formed in a molding in contrast with conventional expansion molding. Thus, the mechanical characteristics, such as strength, rigidity, and heat resistance, of a molding are not impaired.

Since the laminated molding 50 features both sufficient lightness and improved mechanical characteristics such as rigidity and strength, application of the laminated molding 50 to transportation machinery parts such as automobile parts improves the mechanical efficiency or the like of transportation machinery. Also, application to building and civil engineering members such as cable troughs facilitates installation work because of lightness.

EXAMPLES

The effect of the present invention will now be described by way of example.

Example 1

The laminated molding 50 was obtained by molding based on the above embodiment and through use of the die 10, injection molding machine 1, and molding procedure as described above. Specifically, the following molding material, die, injection molding, and molding procedure were employed.

a) Molding material: Fiber-containing polypropylene pellets were singly used.

Figure 4:
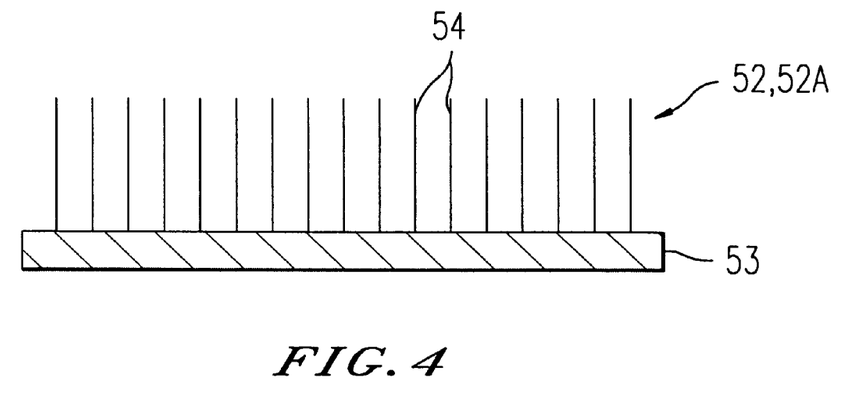
FIG. 4 is a sectional view of the surface coat material which is used in Examples 1 and 2 of the present invention, and Comparative Examples 1 through 3.

Pellet composition
Glass fibers: 40% by weight
Polypropylene: 58% by weight
Maleic acid-modified polypropylene: 2% by weight
Pellet length: 15 mm
Glass fiber length: 15 mm b) Die: A die according to the above embodiment and intended to manufacture the laminated molding 50 assuming the form of a rectangular flat sheet and having the following dimensions:

Width W of laminated molding 50: 600 mm
Depth D of laminated molding 50: 300 mm
Thickness of laminated molding 50: Variable with movement of a movable core
Die temperature during molding: 30° C.

c) Injection molding machine: An injection molding machine according to the above embodiment was used under the following conditions:

Compression ratio of screw: 1.8
Nozzle diameter: 10 mm
Molten resin temperature: 250° C. (as measured in injection cylinder)

d) Surface coat material: The surface coat material 52A (2.5 mm thick) as shown in FIG. 4 was used. The surface coat material 52A was composed of a sheet-like backing material 53 and countless minute hairs 54 implanted in the backing material 53.

e) Molding procedure: A molding procedure according to the above embodiment and including the following steps (1)–(3) (see FIG. 3):

(1) Before the molten resin was injected, the resin was plasticized and measured in an amount equivalent to the volume of the cavity 11 having a thickness T of 4.5 mm through use of the injection apparatus 1A. The surface coat material 52A was attached to the movable core 12 of the die 10. Then, the die 10 was closed, and the movable core 12 was advanced to the position L. The position L was set such that the thickness T1 of the cavity 11 becomes 20 mm. In this state, the molten resin was all injected into the interior of the die 10.

(2) Upon start of injection of the molten resin, the movable core 12 was advanced to the position M while the molten resin was being injected into the die 10. The position M was set such that the thickness T2 of the cavity 11 becomes about 6 mm. The advancing rate of the movable core 12 was set such that the movable core 12 reaches the position M after the injection of the molten resin is completed.

(3) After the elapse of 3 seconds following the movable core 12 reaching the position M, the movable core 12 was retreated to the position N, where the molten resin was allowed to cool and solidify. The position N was set such that the thickness T3 of the cavity 11 becomes 20 mm.

Example 2

The molding conditions of Example 1 were modified as below, and the laminated molding 50 was obtained in a manner similar to that of Example 1.

Compression ratio of screw of injection molding machine: 2.5
Nozzle diameter of injection molding machine: 6
Thickness T3 of cavity 11: 14 mm

Example 3

The molding conditions of Example 1 were modified as below, and the laminated molding 50 was obtained in a manner similar to that of Example 1.

a) Molding material: Fiber-containing polypropylene pellets and polypropylene pellets were dry-blended such that the glass fibers content becomes 30% by weight, thereby obtaining the molding material. To 100 parts by weight of the thus-obtained molding material were added 0.3 parts by weight of a foaming agent. (The addition of the foaming agent was achieved by adding 1 part by weight of master batch pellets (POLYSLEN EV-306G; trade name of product of Eiwa Kasei Kogyo Co., Ltd.), which contain the foaming agent in an amount of 30% by weight.)

Figure 5:
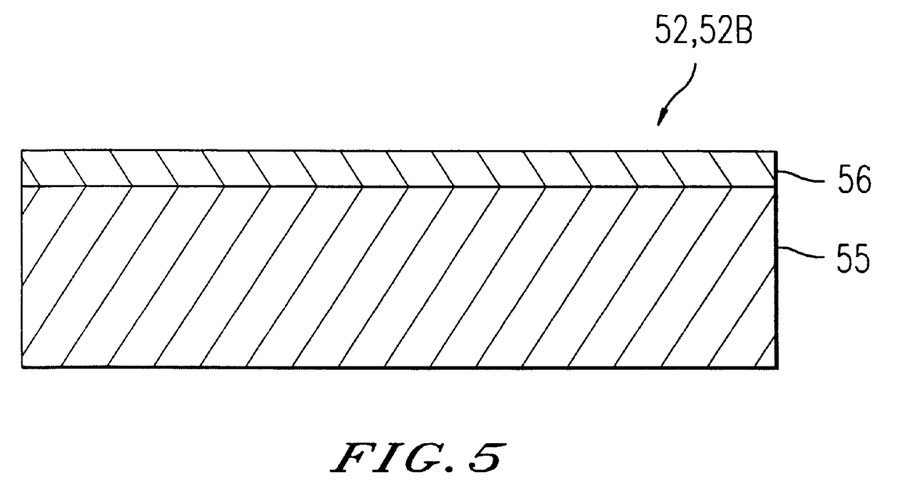
FIG. 5 is a sectional view of the surface coat material which is used in Example 3 of the present invention, and Comparative Example 4.

Composition of fiber-containing polypropylene pellets:
Glass fibers: 60% by weight
Polypropylene: 38% by weight
Maleic acid-modified polypropylene: 2% by weight
Pellet length: 8 mm
Glass fiber length: 8 mm
Melt index (MI) of polypropylene pellets: 60 g/10 minutes (230° C., 2.16 kgf)

b) Die: Similar to that of Example 1; die temperature: 20° C.

c) Surface coat material: The surface coat material 52B (3 mm thick) as shown in FIG. 5 was used. The surface coat material 52B was composed of an expanded polypropylene material 55, which was expanded to about 15 times its original volume, and a vinyl chloride leather 56 bonded to the material 55.

e) Molding procedure: The molding procedure of Example 1 was modified in the following manner. In step (1), the amount of the injected molten resin was equivalent to the volume of the cavity 11 having a thickness T of 3.0 mm. In step (2), the position M was set such that the thickness T2 of the cavity 11 becomes 5.7 mm. In step (3), the position N was set such that the thickness T3 of the cavity 11 becomes 15 mm.

Comparative Example 1

The molding conditions of Example 1 were modified as below, and the laminated molding was obtained in a manner similar to that of Example 1.

a) Molding procedure: Step (3) of Example 1, in which the movable core 12 is retreated to the position N, was omitted. The molten resin was allowed to cool while the movable core 12 was held in the advanced position M.

Comparative Example 2

The molding conditions of Example 1 were modified as below, and the laminated molding was obtained in a manner similar to that of Example 1.
a) Molding procedure: In step (1) of Example 1, the position L was set such that the thickness T1 of the cavity 11 becomes about 5.5 mm. The movable core 12 was not advanced (step (2) of Example 1 was omitted). In step (3) of Example 1, the movable core 12 was moved from the position L to the position N.

Comparative Example 3

The molding conditions of Example 1 were modified as below, and the laminated molding was obtained in a manner similar to that of Example 1.
a) Molding procedure: In steps (2) and (3) of Example 1, the movable core 12 was not advanced or retreated. That is, molding was performed while the thickness T of the cavity 11 was held at T1=T2=T3=20 mm.

Comparative Example 4

Short fibers, which cannot be expected to induce a springback phenomenon, were contained as reinforcing fibers in fiber-containing resin pellets. Also, a foaming agent was added to the pellets in order to accelerate resin expansion.

Specifically, the molding conditions of Example 3 were modified as below, and the laminated molding was obtained in a manner similar to that of Example 1.
a) Molding material: Fiber-containing polypropylene pellets were singly used. To 100 parts by weight of the fiber-containing polypropylene pellets were added 1.5 parts by weight of a foaming agent. (The addition of the foaming agent was achieved by adding 5 parts by weight of master batch pellets (POLYSLEN EV-306G; trade name of product of Eiwa Kasei Kogyo Co., Ltd.), which contain the foaming agent in an amount of 30% by weight.)

Composition of fiber-containing polypropylene pellets
    Glass fibers: 30% by weight
    Polypropylene: 69% by weight
    Maleic acid-modified polypropylene: 1% by weight
  Pellet length: 3 am
  Glass fiber length: 0.61 mm The products (laminated moldings) obtained in Examples 1 to 3 and Comparative Examples 1 to 4 were evaluated for expansion ratio, the average length of contained glass fibers, cooling time, and conditions (condition of surface coat, appearance, and condition of expansion). The results are shown in Table 1. The evaluation methods are described below.

Expansion ratio of product:

The expansion ratio α was obtained by the formula below. Based on the thus-obtained expansion ratio α, the products (laminated moldings) were evaluated for their degree of expansion.

$$\alpha = V \cdot \rho / W$$

where V: Volume of molding excluding surface coat material
  ρ: Average density of molding material
  W: Weight of resin injected into die Average length of glass fibers contained in product:

Each of the products was ashed. Remaining glass fibers were removed from the ash and directly printed onto printing paper at 10 magnifications through use of a universal projector. Subsequently, the length of the projected glass fibers was measured through use of a digitizer. The weight average fiber length of about 5,000 glass fibers was obtained.

Cooling time:

In each of Examples 1 to 3 and Comparative Examples 1 to 4, a plurality of laminated moldings were manufactured and cooled for respective cooling times, which are different at 10-second intervals. Laminated moldings free of thermal expansion or thermal shrinkage were evaluated as acceptable products. The shortest cooling time required for obtaining an acceptable product was obtained.

Product conditions:

The surface coats of the products were visually observed and touched with a hand to thereby be evaluated for appearance, tactile property, and the like.

The products were visually observed for appearance including the smoothness of their back surfaces (surface opposite to surface coat material) to thereby be evaluated for appearance.

Each of the products was cut at the central portion thereof, and the cross-section was visually observed for a large hollow and the internal condition of expansion.

TABLE 1

| | Expansion ratio | Average length of contained glass fibers Mm | Cooling time Sec | Condition of expansion, condition and appearance of surface coat |
|---|---|---|---|---|
| Example 1 | Approx. 3.8 | 6.8 | 100 | Surface coat was in good condition with no crush of implanted hairs. A smooth skin layer was formed on the back surface. Good expansion |
| Example 2 | Approx. 2.6 | 4.6 | 80 | Surface coat was in good condition with no crush of implanted hairs. A smooth skin layer was formed on the back surface. Good expansion |
| Example 3 | Approx. 4.0 | 5.8 | 160 | Surface coat exhibited good cushioning property. A smooth skin layer was formed on the back surface. Good expansion. |
| Comparative Example 1 | 1.0 (not expanded) | 6.4 | 40 | Expansion was not observed. |
| Comparative Example 2 | Approx. 4.0 | 5.2 | 120 | Expansion was good, but hairs of surface coat were crushed. |
| Comparative Example 3 | — | — | — | No product was obtained due to short shot. |
| Comparative Example 4 | Approx. 1.4 | 0.54 | 180 | Surface coat had excellent cushioning property. However, expansion was unsatisfactory, and an internal hollow is formed. |

According to Examples 1 and 2, the surface coat material is held in good condition. The molten resin is sufficiently expanded; thus, weight reduction is sufficiently attained. The products exhibit excellent appearance.

According to Example 3, the foaming agent helps attain a sufficient expansion rate even though the amount of glass fibers contained in the molding material is smaller than that of Example 1 thus, weight reduction is sufficiently attained. Also, as in Example 1, the surface coat material is held in good condition, and excellent appearance is attained. Further, cooling time can be reduced.

In Examples 1 to 3, a relatively high expansion ratio is obtained since fibers escaped being broken. This indicates that preferably, the nozzle diameter is not less than 5 mm and the compression ratio of the screw is not greater than 3.0, in order to prevent reinforcing fibers from breaking when the fibers have a length similar to those of Examples 1 to 3.

In Comparative Example 1, since the movable core 12 was not retreated, the expansion of the resin was not observed; consequently, weight reduction is not attained.

In Comparative Example 2, since the resin pressure applied to the surface coat material was relatively high, the implanted hairs were crushed; consequently, the peculiar tactile property and appearance of the surface coat material are impaired.

In Comparative Example 3, since the movable core 12 was not retreated, a short shot occurred; consequently, a desired product was not obtained.

In Comparative Example 4, since the length of glass fibers contained in the molding material was short, expansion did not sufficiently occur.

The above-described embodiments and examples are to be considered as illustrative and not restrictive. The invention is not to be limited thereto, but may be modified without deviating from the gist of the invention.

For example, as in an ordinary injection molding machine, the movable die and the movable core may move bidirectionally in a horizontal or vertical direction.

Also, the thermoplastic resin serving as the main component of resin pellets is not limited to polypropylene, but may be any of polyolefin resins such as propylene-ethylene block copolymers and polyethylene, polyethylene resins, polystyrene resins, ABS resins, polyvinyl chloride resins, polyamide resins, polyester resins, polyacetal resins, polycarbonate resins, aromatic polyether or thioether resins, aromatic polyester resins, polysulfone resins, and acrylate resins. The specific composition of a thermoplastic resin can be selected as adequate so long as the thermoplastic resin enables the manufacture of a molding reinforced with glass fibers.

Reinforcing fibers contained in resin pellets are not limited to glass fibers, but may be ceramic fibers, inorganic fibers, metallic fibers, organic fibers, or the like. Reinforcing fibers to be used may be selected as adequate when the invention is embodied.

The surface coat material is not limited to a material implanted with hairs or covered with leather, but may be any of existing surface coat materials to be attached onto the surfaces of resin moldings. A surface coat material to be used may be selected as adequate when the invention is embodied.

What is claimed is:

1. A method of molding a fiber-reinforced resin laminate, comprising the steps of:
    attaching a surface coat material to a movable die capable of advancing into and retreating from the internal die cavity,
    injecting into the die cavity a molten thermoplastic resin containing 5% to 70% by weight reinforcing fibers that have a length of 2 mm to 100 mm, advancing the movable die so as to compress the molten resin contained in the die cavity, and
    expanding the volume of the die cavity to that of the intended molding so as to obtain a unitary fiber-reinforced resin molding laminated with a surface coat material.

2. The method of claim 1, wherein the molten resin comprises a foaming agent in an amount equal to or less than 3 parts by weight to 100 parts by weight of molding material.

3. The method of claim 1, wherein the molten resin is expanded to 1.3 times to 6 times its original volume.

4. The method of claim 1, wherein the molten resin is expanded to 1.5 to 5 times its original volume.

5. The method of claim 1 wherein the surface coat is a multilayered material.

6. The method of any one of claims 1, 2, 3, 4 or 5, wherein the reinforcing fibers are either glass fibers or carbon fibers.

7. The method of any one of claims 1, 2, 3, 4 or 5, wherein the thermoplastic resin is a polypropylene synthetic resin.

8. The method of claim 1, wherein the molten thermoplastic resin is produced by a process comprising plasticization and kneading of at least some fiber-containing thermoplastic resin pellets having a length of 2 mm to 100 mm that contain 20% to 80% by weight reinforcing fibers, wherein said fibers have a length equal to that of said resin pellets, and wherein said fibers are arranged in parallel.

9. A laminated molding of a fiber-reinforced resin obtained by the method of any one of claims 1, 2, 3, 4 or 5.

10. A laminated molding of fiber-reinforced resin obtained by the method of any one of claims 1, 2, 3, 4 or 5, wherein the average fiber length of the reinforcing fibers is from 2 mm to 20 mm.

11. A laminated molding of fiber-reinforced resin obtained by the method of any one of claims 1, 2, 3, 4 or 5, wherein the average fiber length of the reinforcing fibers is from 4 mm to 12 mm.

12. A laminated molding of a fiber-reinforced resin obtained by the method of claim 6.

13. A laminated molding of a fiber-reinforced resin obtained by the method of claim 7.

14. A laminated molding of a fiber-reinforced resin obtained by the method of claim 8.

* * * * *